United States Patent [19]

Martin et al.

[11] 4,310,165

[45] Jan. 12, 1982

[54] ELASTOMERIC PACKING FOR A CLAMPED CONNECTION

[75] Inventors: Hans Martin, Stuttgart; Kurt Scharpf, Moensheim, both of Fed. Rep. of Germany

[73] Assignee: Suddeutsche Kuhlerfabrik Julius Fr. Behr GmbH & Co. KG, Stuttgart, Fed. Rep. of Germany

[21] Appl. No.: 98,840

[22] Filed: Nov. 30, 1979

[30] Foreign Application Priority Data

Dec. 4, 1978 [DE] Fed. Rep. of Germany ....... 2852409

[51] Int. Cl.³ ............................................. F16J 15/42
[52] U.S. Cl. ..................................... 277/205; 277/226
[58] Field of Search ............. 277/205, 36, 207, 207 A, 277/DIG. 2, 226

[56] References Cited

U.S. PATENT DOCUMENTS

| | | | |
|---|---|---|---|
| 3,390,890 | 7/1968 | Kurtz | 277/205 |
| 3,599,490 | 8/1971 | Love | 277/205 |

FOREIGN PATENT DOCUMENTS

| | | |
|---|---|---|
| 1812544 | 6/1905 | Fed. Rep. of Germany . |
| 6937598 | 3/1971 | Fed. Rep. of Germany . |
| 7115418 | 8/1971 | Fed. Rep. of Germany . |
| 1538954 | 5/1968 | France . |

*Primary Examiner*—Robert I. Smith
*Attorney, Agent, or Firm*—Schwartz, Jeffery, Schwaab, Mack, Blumenthal & Koch

[57] ABSTRACT

Disclosed is an elastomeric packing suitable for use in connections between a first part and second part wherein the packing is placed under a compressive force. The packing comprises a generally solid cross section having a recess therein for absorbing deformation of the packing due to the compressive force. Also disclosed is a fluid-tight sealed connection, e.g., in a heat exchanger, employing the disclosed packing.

12 Claims, 15 Drawing Figures

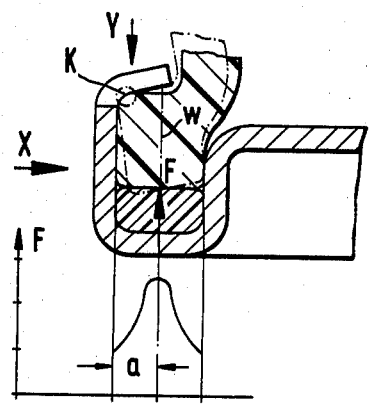
FIG. 1A
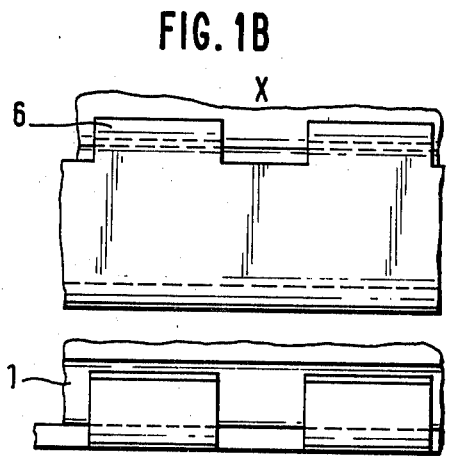
FIG. 1B
FIG. 1C
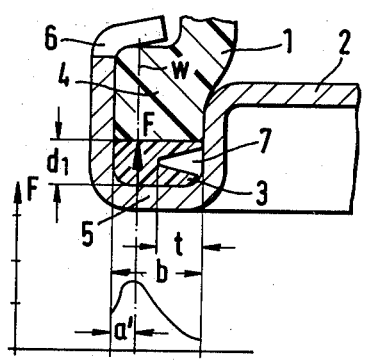
FIG. 2A
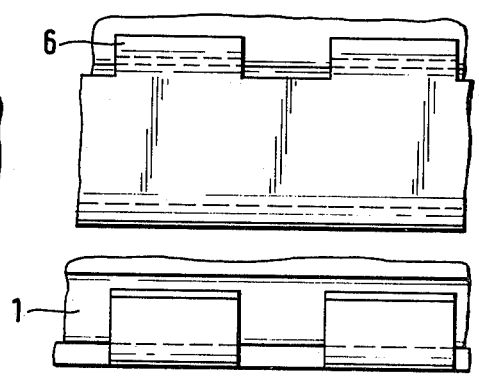
FIG. 2B
FIG. 2C

ELASTOMERIC PACKING FOR A CLAMPED CONNECTION

BACKGROUND OF THE INVENTION

The present invention pertains to a gasket or packing, and more especially to an elastomeric packing for use in a clamped connection, particularly in a flanged joint.

In known clamping connections, such as, for example, flanged joints, the corresponding packings have a closed and full cross section, which in the compressed state completely fills the space provided for the packing (DE-OS No. 23, 53 442 and DE-Gbm No. 74 14 342). In the case of, for example, O-ring shaped packings with relatively slight prestressing paths (deformations), high restoring forces (deformation forces) result, which stress the joint in turn and many lead to the bending of the flanged edging area until the joint is functionally disabled. On the other hand, certain minimum sealing forces must be assured based on a given internal pressure. As a result of the constant sealing mass, on the one hand, and as a result of tolerances existing in this type of joints due to the manufacturing process, i.e., of the thickness of the sheet metal and the packing, on the other hand, and also because of the progressively rising stress-strain characteristic of the packing, these sealing forces are often significantly exceeded so that the flanged connection may be harmfully overstressed.

SUMMARY OF THE INVENTION

It is therefore an object of the present invention to provide an improved gasket or packing.

It is a further object of the invention to provide an improved elastomeric packing for use in a clamped connection, particularly in a flanged connection.

Another object of the invention resides in providing a packing for a clamped connection, wherein the deforming forces as a function of deformation are relatively low and rise as little as possible, while sealing forces remain adequate and the joint is stressed mechanically to the least possible degree.

It is also an object of the invention to provide an improved sealed structure particularly of the flanged type, using the improved packing of the connection.

In accomplishing the foregoing objects, there has been provided in accordance with the present invention an elastomeric packing suitable for use in connections between a first part and second part wherein the packing is placed under a compressive force. The packing comprises a generally solid cross section having a recess therein for absorbing deformation of the packing due to the compressive force. In one preferred embodiment the recess comprises an approximately triangular slit, and in another preferred embodiment the recess comprises a void enveloped within the cross section of the packing.

In accordance with another aspect of the present invention, there has been provided a fluid-tight sealed connection, comprising a first member having a flange portion; a packing member; and a second member having a recess adapted for receiving the packing member and the flange portion of the first member. The recess has an edge portion which is deformed about the flange portion of the first member to hold said first and second members in compressive contact with the packing member. In this connection the packing member comprises the elastomeric packing according to the invention, as defined above.

Further objects, features and advantages of the invention will become readily apparent to the skilled artisan from the detailed description of preferred embodiments which follows, when considered together with the attached figures of drawing.

BRIEF DESCRIPTION OF THE DRAWINGS

In the drawings:

FIG. 1A is a cross-sectional view of a connection having a conventional packing for a flanged connection together with a curve illustrating its sealing force;

FIG. 1B is a side view of the connection of FIG. 1A;

FIG. 1C is a top view of the connection of FIG. 1A;

FIG. 2A is a cross-sectional view of a connection using the packing according to the invention having a triangular slit, in a flanged joint with closing flaps, together with a curve illustrating its sealing force;

FIG. 2B is a side view of the connection of FIG. 2A;

FIG. 2C is a top view of the connection of FIG. 2A;

DETAILED DESCRIPTION OF PREFERRED EMBODIMENTS

Figures 3A, 3B, 3C:
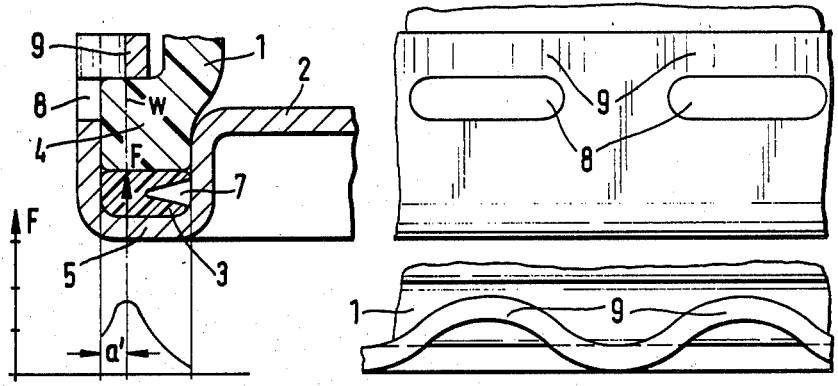
FIG. 3A is a cross-sectional view of a connection using another packing according to the invention, having a triangular slit for a special clamping connection, together with a curve illustrating its sealing force.
FIG. 3B is a side view of the connection of FIG. 3A.
FIG. 3C is a top view of the connection of FIG. 3A.

According to the invention, the cross-section of the gasket is provided with a recess for absorbing the deformation of the packing. By means of this recess according to the invention, initially a reduction of the deforming forces is obtained, in comparison with other known packings for the same degree of deformation. Because of the lower restoring forces of the packing according to the invention, there are lower reactive forces acting on the clamping or flanged joint so that they are exposed to a lower mechanical load and thus have longer useful lives. The reduced reaction forces acting on the joint further yield the advantage that the thickness of the material of the parts to be joined may be reduced, particularly that of the part to be deformed or flanged. It is also advantageous in the use of the packing according to the invention that higher structural tolerances may be selected for the parts to be joined, because this will not result in significantly higher restoring forces.

According to a further advantageous embodiment of the invention, an approximately triangular deforming slit is provided in the packing, which during the joining of the two parts absorbs the strain of the packing. The particular advantage of this inwardly located deformation slit consists of the fact that an effective sealing action is obtained at both of the external lips, because of the internal pressure acting inside the triangular slit.

Another advantageous embodiment of the invention provides a void inside the cross-section of the packing, so that the advantage of a packing in contact over its entire circumference and well placed in the packing chamber is obtained.

According to a further advantageous embodiment of the invention, the full sealing cross section of the packing is located at the outer side of the clamped connection, while the part of the packing cross section reduced by the recess is on the inside. This configuration effects the relocation of the resultant of the sealing forces to the outside of the clamped connection, so that, because of the reduced lever arm, the bending moment acting on the joint (i.e., the flange overlap or sealing bead and the flange) is diminished. This again leads to less stress on the clamped connection, resulting to longer life and improved functional capabilities of the clamped joint.

According to another advantageous embodiment of the invention, the packing has a rectangular cross section, reduced in its inner-lying area by means of a recess in the form of a triangle or a void. Because of this rectangular cross section, which is placed in a corresponding rectangular groove representing the sealing chamber, the packing is guided satisfactorily during the joining of the two parts, i.e., during the compression of the flange into the groove and the subsequent folding of the deformable edge area.

According to one preferred embodiment, the packing is advantageously designed as a profiled gasket having a closed outline intended for a heat exchanger. In heat exchangers of this type, one part consists of a relatively thin walled metal sheet, while the other part is characterized by a cover made of a synthetic plastic material having a flange around which the metal sheet is folded or crimped or fastened by any other desired type of clamping connection. The reduced mechanical stress, which exists for the flange in a multiaxial state of stress, also diminishes the relaxation (creep) of the synthetic plastic material, i.e., the flange retains its original shape and the sealing tightness of the clamped connection is retained. Such heat exchangers are produced, for example, as radiators or heaters for automotive vehicles in very great numbers, and the parts to be joined, such as metal sheet bottoms and synthetic plastic flanges, together with the packing, often display substantial tolerances. This gives rise, due to the technical sealing process, to greatly differing reaction forces. Here, the packing according to the invention, which may be designed as a profiled gasket having a closed rectangular configuration, may be of particular advantage.

Further embodiments of the invention are shown in the drawings and will be explained in more detail hereinafter. Referring now to the drawings, in FIGS. 1A–1C a conventional flanged connection with a conventional packing having a full sealing cross-section is shown. The sealing force F, as the force reacting to the compressive force, acts along a line of action w approximately in the center of the width of the packing. This leads to a moment acting on the flange, tending to rotate it around the edge k. This bending moment F.a around the axis of rotation K leads to a twisting and thus an altered position of the flange, as represented by the broken lines.

FIGS. 2A–2C show a conventional flanged joint wherein the parts 1 and 2 are joined together by the bending over of a deformable edge area consisting of individual closing flaps 6 around the flange 4. The part 2 here represents the metal sheet bottom of a heat exchanger carrying the corresponding tubes, not shown, and comprising in its outer area a groove-like circumferential channel 5, while part 1 is the synthetic plastic cover or water box for said heat exchanger terminating in the flange 4, which fits into the channel 5. Between the flange 4 and the bottom of the groove-shaped channel 5, the packing or gasket 3 according to the invention is arranged. This packing is characterized by a triangular recess 7 on the right hand, i.e., the inner side of the flanged connection. In comparison with the entire compressed width b of the packing, the triangular deformation slit 7 has a depth t, corresponding to approximately one half of the compressed width b. This configuration of the packing 3 in relation to the corresponding configuration of the groove 5 results in a sealing force F acting along a line of action w on the left hand, i.e., the outer side of the flanged joint. Compared with FIG. 1A, it is seen that the effective lever arm a' is substantially reduced with respect to a, resulting in a similar reduction of the moment F.a' acting on the flanged connection, as compared with the moment F.a in FIG. 1A. The flange or foot 4 of the cover 1 is therefore (if the packing 3 of the invention is used) no longer stressed to the extent shown in FIG. 1A, so that the entire connection is more functional.

FIGS. 3A–3C show the packing 3 of the invention having the triangular deformation slit 7 for another type of clamped connection, as described in German Patent Application No. P 28 52 408.5 and a corresponding application of the present applicant filed simultaneously with the instant application (Sn 098839, filed 11/5/79) the disclosure of both of which is hereby incorporated by reference. In this clamped connection, again, two parts 1 and 2, representing the cover 1 with the flange or foot 4 and the bottom plate 2 with its groove-shaped channel 5 of a heat exchanger, are joined together. As seen in FIGS. 3B and 3C, corrugated sections 9, located above elongated holes 8, are pushed over the foot 4 of the cover 1, so that a solid joint between the parts 1 and 2 is established. The deformable edge section thus has a fundamentally different configuration than that of the conventional flanged joint of FIG. 2A. For this type of the novel clamped connection, the packing 3 according to the invention is particularly advantageous because a longer path of deformation of the packing is required when joining the two parts 1 and 2. The foot 4 of the cover 1 must be pushed downwardly, i.e., onto the packing 3, until the sections 9 located above the longitudinal holes 8 may be pushed freely over the upper edge of the foot 4, to attain their corrugated configuration. Then the foot 4 is resiliently returned to the lower edge of the corrugated sections 9 by the restoring force in the packing 3. The course of the line of action w of the sealing force F also indicates that the bending moment F.a' is relatively smaller, and that thus the mechanical stress acting on this clamped connection is reduced in comparison with conventional packings.

Figures 4A, 4B, 4C:
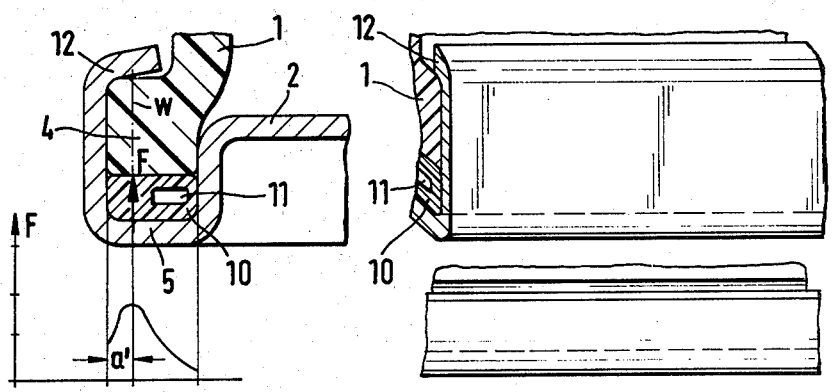
FIG. 4A is a cross-sectional view of a connection using another embodiment of the packing according to the invention, having a void, in a flanged joint having a closing strip, together with a curve illustrating its sealing force.
FIG. 4B is a side perspective view of the connection of FIG. 4A.
FIG. 4C is a top perspective view of the connection of FIG. 4A.

FIGS. 4A–4C show a further advantageous embodiment of the packing 10 according to the invention, which has a closed cross section and a void 11 arranged inside the said packing 10. This void 11 is, in a manner similar to the above-mentioned triangular deformation slit 7, capable of absorbing deformations of the packing 10, so that the advantages described in connection with the packing 3 are again obtained. This packing 10 with the void 11 has the further advantage that it is contained on all sides in the groove-like channel 5 of the bottom plate 2, thus filling the existing groove cross section of the bottom 2 uniformly. This type of flanged connection is established by the closing, i.e., the bending of the continuous closing strip 12 around the flange 4 of the cover 1. Here again the shortened lever arm a' of the sealing force F and of its line of action w acts to reduce the mechanical stress on the flanged joint.

Figures 5A, 5B:
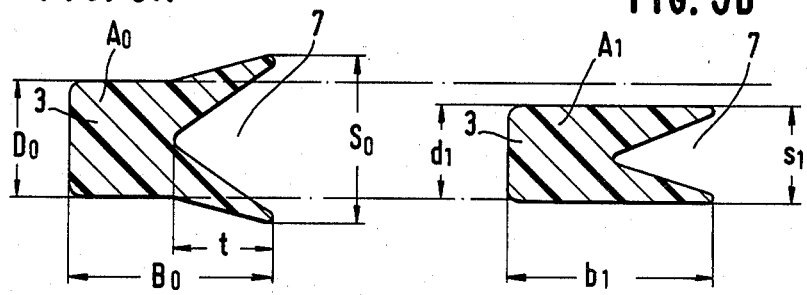
FIGS. 5A and 5B are cross-sectional views of the packing according to the invention in the undeformed and in the deformed state.

FIGS. 5A and 5B show the packing 3 according to the invention, on the left side in the undeformed and on the right side in the deformed state, wherein the packing 3 has been compressed in a groove-shaped channel in the vertical direction. The undeformed packing 3 has a cross section $A_o$ and the additional outside dimensions $D_o$ and $S_o$, with $B_o$ as the width. Corresponding designations $A_1$, $d_1$, $S_1$ and $b_1$ refer to the packing 3 in the deformed state (FIG. 5B), wherein $B_o$ and $b_1$ have the same dimensions in both cases, because the width of the sealing chamber is constant. The cross sections of the packing 3 in the undeformed and in the deformed state $A_o$ and $A_1$, respectively, may be considered approximately equal, because the material of the packing, an elastomer, is practically incompressible. The deformation of the packing 3 from the initial dimensions $S_o$ and $D_o$ to the final dimensions $S_1$ and $d_1$ is thus essentially absorbed by the recess 7 according to the invention. This results in the improvement of the sealing characteristic desired, i.e., a reduction in the restoring forces with an equal amount of deformation, over the conventional packings.

Figure 6:
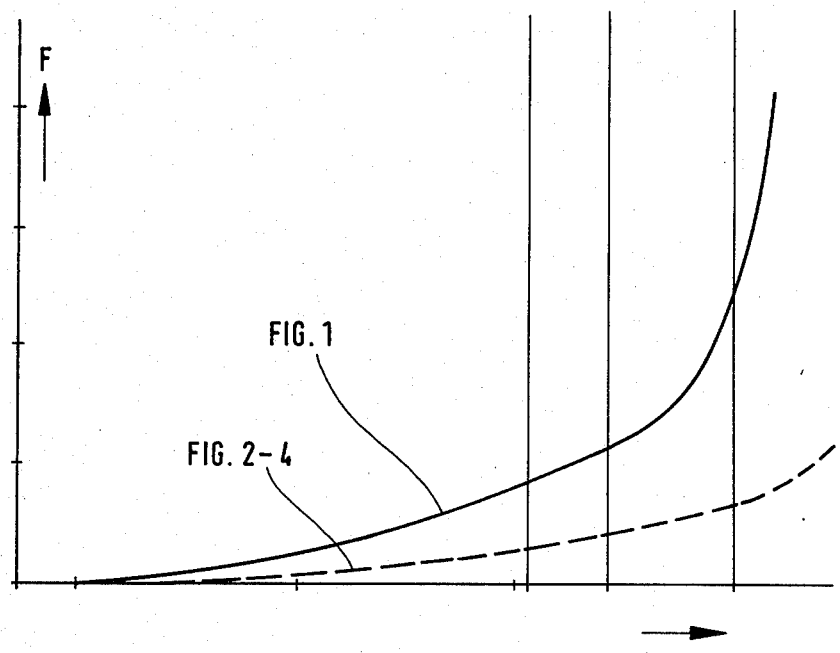
FIG. 6 is a diagram of the relationship between compressive force and deformation for a conventional packing and the packing according to the invention.

FIG. 6 finally shows a diagram with the characteristic curves of a conventional packing and a packing according to the invention, the latter indicated by a broken line. In the diagram, the compressive force F (i.e., the reacting force of the packing on the parts to be compressed) is plotted versus the deformation of the packing. It may be seen from this comparison of the two curves that for the conventional packing (a round cord in this case), during a similar deformation of the packings, the resulting compressive forces are substantially higher and are increasing in a strongly progressive manner in the upper range of deformation, while the compressive force for the packing according to the invention in this range of minimum and maximum deformation, i.e., the lowest and highest compression, is approximately linear and flat. The diagram also shows clearly that the configuration according to the invention provides a packing adapted specifically to the technical processes of flanging or clamping or similar types of joining, wherein the necessary sealing forces are generated with a minimum stressing of the joint.

We claim:

1. A fluid-tight sealed connection, comprising
   a first member having a flange portion;
   a packing member; and
   a second member having a recess adapted for receiving said packing member and the flange portion of said first member, said recess having an edge portion which is deformed about the flange portion of said first member to hold said first and second members in compressive force contact with said packing member, wherein said packing member comprises an elastomeric packing comprising a generally solid cross section having a recess therein for absorbing deformation of the packing due to the compressive force, said recess being located asymmetrically with respect to the resultant of the compressive force.

2. A fluid-tight sealed connection as defined by claim 1, comprising a heat exchanger, wherein said first member comprises a water box and said second member comprises a sheet metal header plate.

3. A fluid-tight sealed connection as defined by claim 2, wherein the water box is comprised of a synthetic resinous material.

4. A fluid-tight sealed connection according to claim 1, comprising an automotive engine radiator.

5. A fluid-tight sealed connection as defined by claim 1, wherein the recess in said packing member is located near the edge of said packing which lies opposite to said deformed edge portion of said second member.

6. A fluid-tight sealed connection according to claim 5, wherein said recess comprises an approximately triangular slit.

7. A fluid-tight sealed connection according to claim 6, wherein the depth of the triangular slit is approximately equal to one half of the compressed width of the packing.

8. A fluid-tight sealed connection according to claim 5, wherein said recess comprises a void enveloped within the cross section of the packing.

9. A fluid-tight sealed connection according to claim 5, wherein said packing comprises a generally annular configuration and wherein said recess is located at the inner edge of the packing.

10. A fluid-tight sealed connection according to claim 9, wherein the cross section of the compressed packing comprises a generally rectangular shape.

11. A fluid-tight sealed connection according to claim 1, wherein said edge portion is deformed about the flange portion by folding the edge portion at an angle so that it lies generally parallel to the bottom of said recess and lies in contact with the surface of said flange portion opposite to the surface which is in contact with said packing member.

12. A fluid-tight sealed connection according to claim 1, wherein said edge portion comprises at least one aperture therein located adjacent said flange member, and wherein the edge portion is deformed by deforming the portion thereof between said aperture and the distal edge of said edge portion out of the plane of said edge portion so that the edge of said aperture engages the surface of said flange member opposite the surface thereof which is is contact with said packing member.

* * * * *